United States Patent [19]
Moll

[11] 3,720,783
[45] March 13, 1973

[54] FIRE RETARDANT GROUNDING MEANS FOR JUNCTION BOXES

[75] Inventor: Oswin C. Moll, Bethlehem, Pa.

[73] Assignees: Oswin C. Moll, Bethlehem, Pa.; Leonard H. King, Valley Stream; Campani, Northport, N.Y.

[22] Filed: Nov. 26, 1971

[21] Appl. No.: 202,324

[52] U.S. Cl. .................. 174/51, 174/48, 174/57, 220/3.3, 220/3.7, 220/88 A
[51] Int. Cl. .............................................. H02g 3/12
[58] Field of Search .............. 174/48, 51, 53, 57, 58; 220/3.2, 3.3, 3.4, 3.5, 3.7, 88 A; 339/14 R

[56] References Cited

UNITED STATES PATENTS

| | | | |
|---|---|---|---|
| 848,888 | 4/1907 | Erickson | 220/3.7 |
| 1,688,518 | 10/1928 | Bennett | 174/57 UX |
| 1,767,339 | 6/1930 | Beerhalter | 174/57 |
| 1,961,728 | 6/1934 | Arnest et al. | 174/57 UX |
| 2,272,944 | 2/1942 | Hiltz | 220/3.7 |
| 2,288,377 | 6/1942 | Tuttle | 220/3.7 X |
| 2,989,206 | 6/1961 | McAfee | 220/3.7 |
| 3,115,265 | 12/1963 | Mulkey et al. | 220/3.5 |
| 3,525,450 | 8/1970 | Payson | 220/3.7 |
| 3,651,245 | 3/1972 | Moll | 174/51 |

Primary Examiner—Laramie E. Askin
Attorney—Leonard H. King

[57] ABSTRACT

An electrical receptacle or the like is grounded directly and positively by means of a screw extending through axially shortenable spacer means positioned between the metallic frame of the receptacle and a portion of the metallic junction box on which it is mounted. The junction box is also provided with a cover member having a tubular collar whose length can be reduced as required in order to provide a plane that is substantially flush with a finished wall surface. The collar portion provides a fire retardant enclosure about the electrical receptacle and junction box opening. In an alternate embodiment the collar portion is used to provide a fire retardant grounding means for a previously installed junction box when paneling or the like is added to the wall structure introducing an air gap between the electrical receptacle and the junction box.

18 Claims, 8 Drawing Figures

PATENTED MAR 13 1973 3,720,783

INVENTOR.
Oswin C. Moll

BY

*Leonard H...*

ATTORNEY

INVENTOR.
Oswin C. Moll

BY

Leonard H. King
ATTORNEY

FIRE RETARDANT GROUNDING MEANS FOR JUNCTION BOXES

BACKGROUND OF THE INVENTION

This invention relates generally to outlet or junction boxes such as used in commercial or residential buildings and, more particularly, to improved means for providing fire retardant grounding for the receptacle associated with the junction box.

Many attempts have been made in the prior art to solve the problem of providing a continuous ground for an electrical device having a metallic yoke when mounted on a metallic junction box. When the junction box is mounted flush with the plane of a wall, the problem is non-existent since the electrical device may be readily placed in intimate contact with the junction box providing the electrical ground by means of screws in a conventional manner. However, when the junction box is recessed from the plane of the wall such as in concrete wall construction, the problem of providing a ground between the yoke on the electrical device and the junction box defied a simple solution until the present invention. It is apparent that a junction box being installed recessed from the plane of the wall may be skewed in more than one plane therefor, further complicating grounding problems. Flush mounting of the electrical device presents a similar problem if decorative ornamentation such as panelling is added to the wall surface surrounding the junction box which was previously installed either flush with the existing wall or skewed.

The present invention provides fire retardant means for mounting the metallic yoke of a receptacle or the like, directly on a junction box to form a direct or continuous ground path. In addition, the preferred embodiment of the present invention provides means for completely enclosing the electrical device maintaining the integrity of the original junction box installation.

Earlier improved grounding means for a junction box is disclosed in a prior filed application of Oswin C. Moll, Ser. No. 887,077, filed Dec. 22, 1969, entitled JUNCTION BOX AND GROUNDING MEANS THEREFOR now U.S. Pat. No. 3,651,245.

In accordance with the principles of the preferred embodiment of the present invention, a fire retardant grounding means for an electrical device having a metallic yoke and mounted on a metallic junction box is provided. The means comprises in combination, an elongated tubular spacer extending between the metallic yoke portion of the electrical device and the junction box wherein said spacer is provided with a plurality of axially spaced lines of weakness in the walls thereof adapted to permit shortening of said spacer means as required by mounting the electrical device substantially flush with the room side plane of the finished wall, an elongated tubular collar extending between the metallic yoke portion of the electrical device and the junction box, the collar being provided with a plurality of axially and angularly spaced lines of weakness forming a diamond shape in the walls thereof, the collar being adapted to be shortened to form an irregular edge with portions substantially flush with the room side plane of the finished wall and spacer as required by mounting an electrical device thereon, and metallic fastening means passing through said spacer for providing a ground connection between the yoke, collar, and the junction box. The fastening means being in direct contact with the metallic yoke of the electrical device, the collar, and the junction box, the collar forming a fire retardant enclosure about the electrical device and the fastening means.

In accordance with an alternate embodiment of the present invention, fire-retardant means used in combination with an electrical device having a metallic yoke and mounted on a metallic junction box comprises an elongated tubular shaped collar extending between the metallic yoke portion of the electrical device and the junction box. The collar is provided with a plurality of axially and angularly spaced lines of weakness forming a diamond shaped in the wall thereof. The collar is adapted to be shortened to form an irregular edge. The fire retardant means is retained between the yoke and the junction box.

These and other objects, features and advantages of the invention will, in part, be seen with particularity, and will, in part, become obvious in the following more detailed description of the invention, taken in conjunction with the accompanying drawing which forms an integral part thereof.

DESCRIPTION OF THE DRAWING

In the various figures of the drawing like reference characters designate like parts.

In the drawing.

DESCRIPTION OF THE PREFERRED EMBODIMENT

Figure 1:
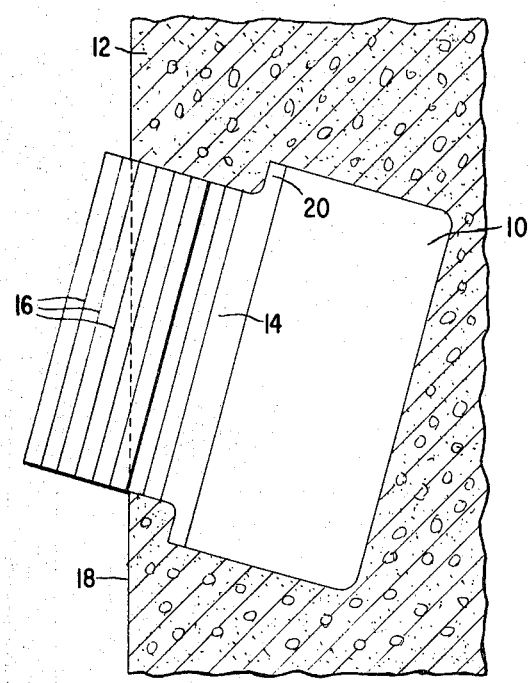
FIG. 1 is an elevational view with the wall partially broken away, illustrating a receptacle grounded to a junction box in accordance with the teaching of the prior art.

In order to be clearly distinguished from the present invention the prior art is illustrated in FIG. 1. There is shown a junction box 10 inserted in a wall 12, typically of concrete material. A collar member 14 is shown mounted on the junction box 10. The collar 14 is provided with axially spaced lines of weakness 16. The lines of weakness are broken at the installation of the junction box to provide a surface approximately flush with the surface of the wall 18. It is apparent from FIG. 1 that removal of portions of the collar 14 along the lines of weakness 16 requires additional cuts at an angle to the lines of weakness 16 to compensate for the skewed position of the junction box 10 before the collar can be made to be approximately flush with the plane of the wall 18.

The collar member 14 is further provided with a lip 20 which is part of the collar member 14 and extends to the edge of junction box 10. The lip 20 is mounted by conventional fastener means to the junction box 10. An electrical device having a metallic yoke such as an electrical outlet socket, not shown, is normally mounted to the junction box 10 and is grounded via the collar member 14 in a conventional manner.

A complete detailed description of the prior art is given in U.S. Pat. No. 3,651,245 to Oswin C. Moll issued on Mar. 21, 1972.

Figure 2:
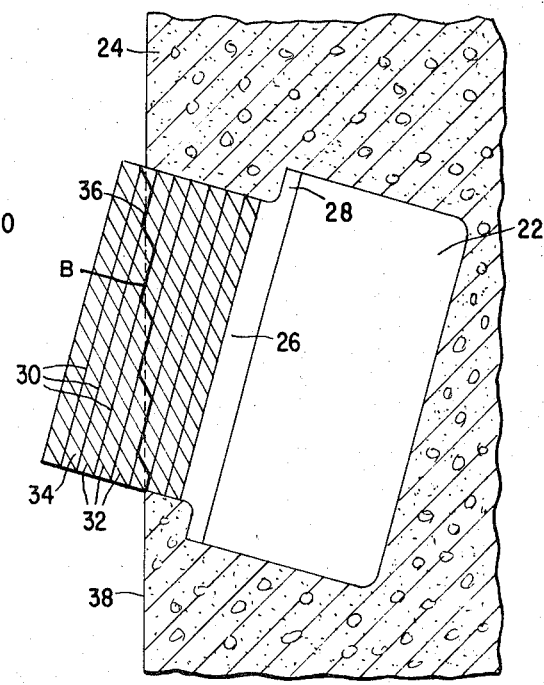
FIG. 2 is an elevational view, with the wall partially broken away and similar in orientation to FIG. 1 but illustrating a receptacle grounded to a junction box with a fire retardant grounding means in accordance with the teaching of the present invention.

The present invention, as illustrated by one embodiment in FIG. 2, overcomes the shortcomings of the prior art. A junction box 22 is inserted in a wall 24, which may be of any suitable material such as concrete, at a skewed angle. The collar 26 having a lip portion 28 is mounted to the junction box 22 in a conventional manner. The collar 26 is provided with axial 30 and angular 32 lines of weakness therein forming a generally diamond-like shape 34. Removing portions of the collar along the lines of weakness 30 and 32 provides an irregular edge 36 which is substantially in a plane 38 of wall 24. An electrical outlet socket, not shown, is adapted to be mounted to the junction box 22 in a conventional manner, and is provided with a ground connection additionally through the irregular edge 36 of collar 26.

Figure 3:
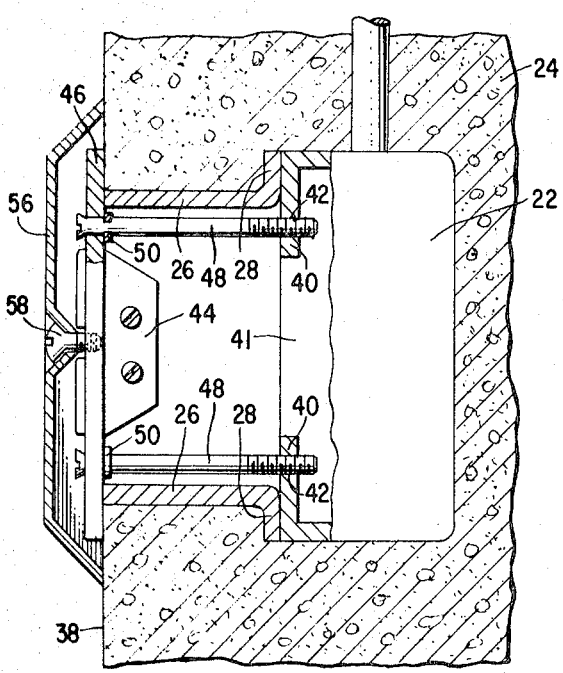
FIG. 3 is an elevational view, partially broken away illustrating an embodiment incorporating the principles of this invention, the basic concept thereof, being applied to a junction box adapted to accommodate an electrical device having a metallic yoke mounted thereon and surrounded by fire retardant means.

A sectional view of the collar 26 having a lip portion 28 is mounted to the junction box 22 and is shown in more detail in FIG. 3. The junction box 22 is mounted in a wall 24 below the plane 38 of wall 24 and is provided with tabs 40 extending inwardly into the opening 41 of the junction box. Tabs 40 are provided with threaded holes 42. The collar 26 is mounted to junction box 22 by conventional fastening means, not shown. After removal of the excess material from the collar 26 an electrical outlet socket 44, having a metallic yoke 46, is mounted, via screws 48 threaded into holes 42 in the junction box 22. Metallic washers 50 are provided on the inner side of yoke 46 to retain the screws 48 within the yoke 46 which extend from the metallic washer 50 to the tab portion 40 of junction box 22. A cover plate 56 is mounted by means of a screw 58 to the electrical outlet socket 44 in a conventional manner.

It will be appreciated that the grounding between the metallic yoke 46 of electrical outlet socket 44 is provided via screws 48, washers 50, as well as collar 26, to the junction box 22. It will also be noted that collar 26 completely surrounds the electrical outlet 44 and the screws 48. This technique of assembly provides dual grounding paths substantially enclosed by a collar member and therefore is not subjected to corrosion that might otherwise result if the outlet was permitted to be in contact with moisture laden wall material such as plaster. In addition, the collar member and junction box combination, by providing a complete enclosure, will prevent fires from escaping to the surrounding wall.

Figure 4:
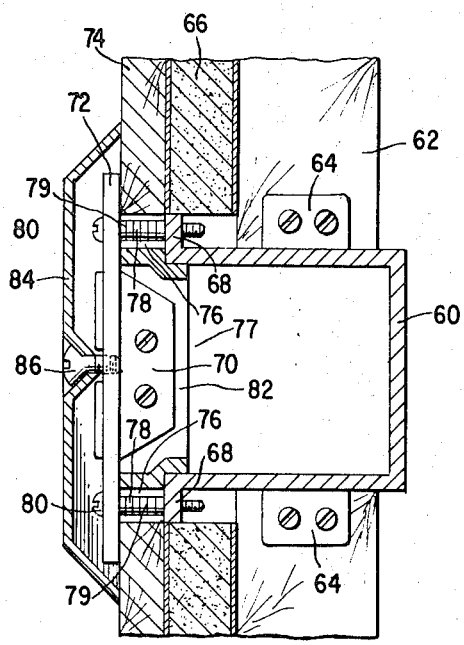
FIG. 4 is a view, similar to FIG. 3, illustrating in elevation a fire retardant grounding means added to a junction box to compensate for the addition of panelling in accordance with the principles of the present invention.

An alternate embodiment of the present invention is shown in FIG. 4, wherein a junction box 60 is mounted to a vertical stud 62 by conventional means applied through tabs 64. The wall material 66 such as plaster board is mounted to the vertical stud 62 in a conventional manner.

The junction box 60 is provided with tabs 68 for mounting an electrical outlet socket 70 having a metallic yoke 72. Additional decorative material such as panelling 74 is added to the wall surface 66 in a conventional manner introducing a gap 76 about the open end 77 of junction box 60. Tubular spacers 78 are provided to mount the metallic yoke 72 by means of screws 80. The metallic tubular spacers 78 are provided with lines of weakness 79 which permit removal of excess material as required.

A fire retardant collar 82, in accordance with the principles of the present invention, is inserted between the junction box opening 77 and the yoke 72 of the electrical outlet 70 to provide further grounding between the junction box 60 and the electrical outlet socket 70. The collar 82 also seals the air gap 76 which developed when the panelling was added to the wall 66 about the junction box. A cover 84 is mounted to the electrical outlet socket 70 by means of screws 86 in a conventional manner.

Figure 5:
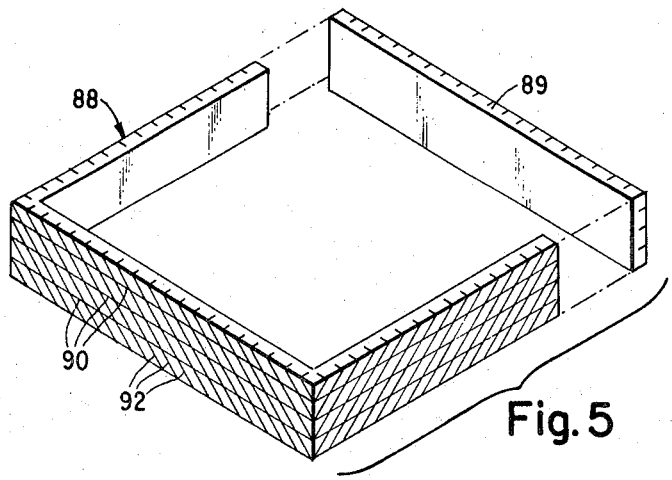
FIG. 5 is a perspective view of a fire retardant insulated collar with one side wall member removed for ganging installation.

FIG. 5 shows a collar 88 which has one wall 89 removed. The collar contains axial and angular lines of weakness 90 and 92, respectively. The lines of weakness 90 and 92 provide a means for readily removing excess material in order to provide an edge which will lie in the mounting plane of the wall within which a junction box is mounted. The lines of weakness in the walls of the spaces 78 and collars can be formed either on the inside or outside of the walls of these parts, and such grooves can be filled with a fire-retardant material.

Figure 6:
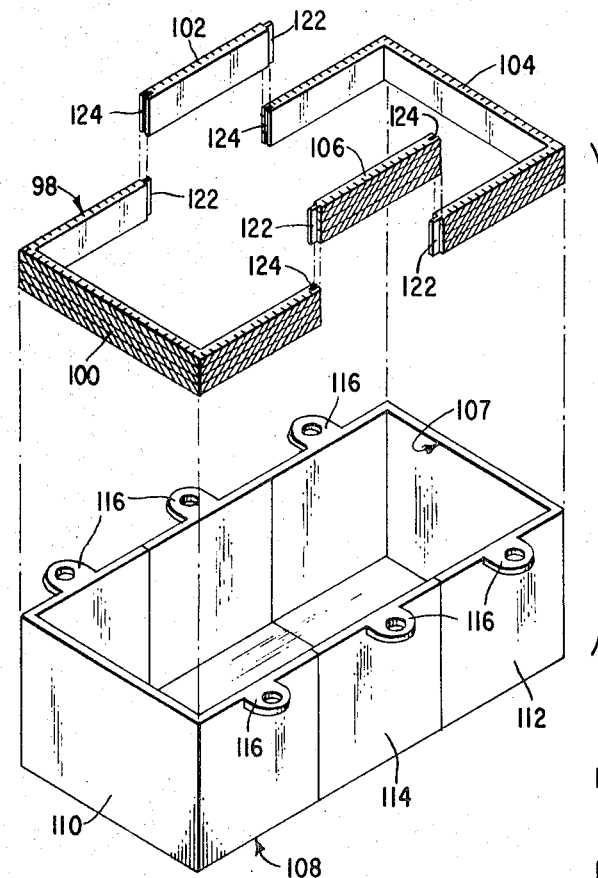
FIG. 6 is an exploded isometric view of a junction box and fire retardant collar prior to assembly in a ganged configuration.

FIG. 6 shows a collar 98 comprising an end section 100, center sections 102 and 106, and an end section 104 adapted for mounting on a multiple junction box assembly 108. The junction box assembly may be the equivalent of three or more sections such as end sections 110 and 112; and center section 114. Each of the sections is provided with end tabs 116 extending outwardly from the open end 107 of junction box assembly 108. The collar member and extension can be fabricated out of non-metallic material.

Figure 7:
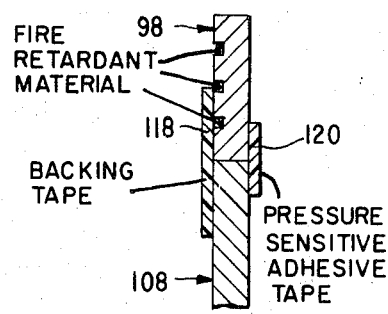
FIG. 7 is a cross-sectional view of one wall of a junction box and fire retardant collar being mounted on a junction box previously assembled.

Shown in cross-section in FIG. 7 is collar assembly 98 affixed to the junction box assembly 108 by means of a bonded thin backing tape 118 and a pressure sensitive adhesive ribbon 120.

The basic advantage of the second embodiment shown in FIG. 6 is obvious. The tongues and grooves 122 and 124, respectively, provided at the edges of collar sections 100, 102, 104 and 106, provide a complete fire retardant collar about the junction box 108. In addition, the collar provides auxiliary grounding means for the electrical outlets, not shown, which may be mounted on the collar by conventional means including spacers, since the spacers and collar assembly 98 are both in the plane of the surface of the wall to which the junction box is assembled.

Figure 8:
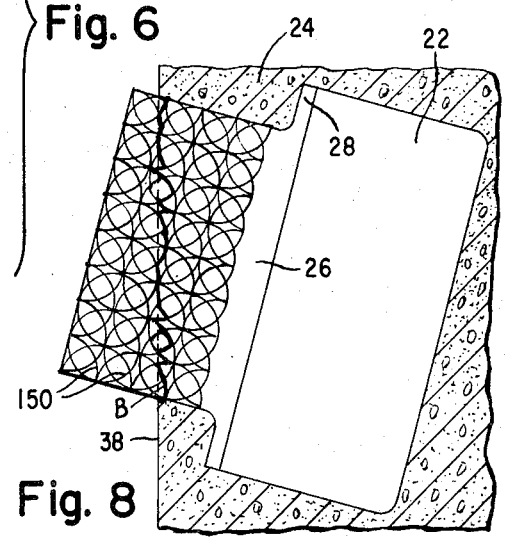
FIG. 8 is an elevational view with the wall partially broken away as in FIG. 2 but showing a different breakaway pattern.

Hereinbefore has been disclosed two alternate embodiments of the invention presently contemplated. These embodiments provide a complete fire retardant enclosure about a junction box as well as a secondary grounding path between the metallic yoke and an electrical outlet and the junction box. The collars disclosed are ideally suitable for installations where the junction box is not mounted in a plane parallel with the plane of the wall in which the junction box has been mounted. While intersecting straight lines may be employed, circles or other intersecting configurations may be utilized. The heavy dark line B (See FIGS. 2 and 8) represents a typical breakaway pattern to match the wall line. By providing a greater number of fracture lines a break line more closely following the wall may be provided. In FIG. 8, circles 150 are shown by way of example. It is to be understood that various changes and modifications may be made thereto without departing from the spirit and the scope of the invention.

What I claim as new and desire to secure by Letters Patent is:

1. Fire retardant grounding means for an electrical device having a metallic yoke and mounted on a metallic junction box comprising, in combination:
   a. an elongated tubular spacer means extending between the metallic yoke portion of the electrical device and the junction box, wherein said spacer means is provided with a plurality of axially spaced lines of weakness in the walls thereof adapted to permit shortening of said spacer means as required by mounting said electrical device substantially flush with the room side plane of the finished wall;
   b. an elongated tubular collar extending between the metallic yoke portion of the electrical device and the junction box, said collar being provided with a plurality of intersecting spaced lines of weakness in the walls thereof, said collar having an irregular edge formed as a result of shortening the same along certain of said lines of weakness, said irregular edge lying substantially flush with the room side plane of the finished wall and spacer means as required by mounting the electrical device thereon; and
   c. metallic fastening means passing through said spacer means for providing a ground connection between said yoke, said collar and said junction box, said fastening means being in direct contact with the metallic yoke of the electrical device, said collar and said junction box, and said collar forming a fire retardant enclosure about said electrical device and said fastening means.

2. Fire retardant grounding means according to claim 1 wherein said lines of weakness in said spacer means are grooves formed in the outside face of said tubular spacer means.

3. Fire retardant grounding means according to claim 1 wherein said lines of weakness in said collar are grooves formed in the outside face of said tubular collar.

4. Fire retardant grounding means according to claim 1 wherein said lines of weakness in said collar are grooves formed in the inside face of said tubular collar.

5. Fire retardant grounding means according to claim 1 wherein said collar is formed in multiple sections and attached by connecting means.

6. Fire retardant grounding means according to claim 5 wherein said connecting means is a tongue-in-groove arrangement.

7. An improved fire retardant junction box for supporting an electrical device having a metallic grounding yoke comprising:
   a. a cup-shaped metallic housing having a plurality of tabs formed at the open end thereof;
   b. elongated tubular spacer means extending outwardly from at least some of said tabs and into contact with the metallic yoke of said electrical device;
   c. metallic fastening means passing through said spacer means, said fastening means being in direct contact with both the metallic yoke portion of the electrical device and at least some tabs for providing a common electrical connection; and
   d. a collar member secured to and enclosing the open end of said housing having a tubular extension depending therefrom in a direction away from said housing, said extension encompassing said fastening means and having a plurality of axially and angularly spaced lines of weakness and also having an irregular edge formed as a result of breaking along certain of the lines of weakness, the resulting outermost portion of said extension being substantially flush and having portions of said irregular edge in contact with the plane of the finished wall in which said junction box is mounted.

8. An improved fire retardant junction box according to claim 7 wherein said collar member and said extension are of a non-metallic and fire retardant material.

9. An improved fire retardant junction box according to claim 7 wherein said lines of weakness are defined by grooves formed on the outside of surface of said tubular extension.

10. An improved fire-retardant junction box according to claim 9 wherein said lines of weakness are filled with a fire retardant material.

11. An improved fire retardant junction box according to claim 7 wherein said lines of weakness of said tubular extension are defined by grooves formed on the inside surface thereof.

12. An improved fire-retardant junction box according to claim 10 wherein said lines of weakness are filled with a fire retardant material.

13. An improved fire-retardant junction box according to claim 7 wherein said collar member and extension are of a metallic material.

14. Fire retardant means used in combination with an electrical device having a metallic yoke and mounted on a metallic junction box comprising an elongated tubular shaped collar extending between the metallic yoke portion of the electrical device and the junction box, said collar being provided with a plurality of axially and angularly spaced lines of weakness forming a diamond shape in the wall thereof, said collar having an irregular edge formed by shortening along certain of the lines of weakness, said fire retardant means being retained between said yoke and said junction box.

15. Fire retardant means according to claim 14 wherein said collar is formed in multiple sections and attached by connecting means.

16. Fire retardant means according to claim 15 wherein said connecting means is a tongue-in-groove arrangement.

17. Fire retardant grounding means for an electrical device having a metallic yoke and mounted on a metallic junction box comprising, in combination:
  a. an elongated tubular collar extending between the metallic yoke portion of the electrical device and the junction box, said collar being provided with a plurality of axially and angularly spaced lines of weakness forming a diamond shape in the walls thereof, said collar being shortened along certain of said lines of weakness and thereby forming an irregular edge with portions substantially flush with the room side plane of the finished wall and with a spacer as required by mounting the electrical device thereon; and
  b. metallic fastening means for providing a ground connection between said yoke, said collar and said junction box, said fastening means being in direct contact with the metallic yoke of the electrical device, said collar and said junction box, and said collar forming a fire retardant enclosure about said electrical device and said fastening means.

18. Fire retardant grounding means according to claim 17 wherein said lines of weakness are grooves formed in the outside face of said tubular collar.

* * * * *